United States Patent [19]
Yoshizaki et al.

[11] 4,231,084
[45] Oct. 28, 1980

[54] DATA TRANSFER SYSTEM

[75] Inventors: Masaaki Yoshizaki; Kenichi Mizuno, both of Yokohama, Japan

[73] Assignee: Hitachi, Ltd., Japan

[21] Appl. No.: 858,820

[22] Filed: Dec. 8, 1977

Related U.S. Application Data

[63] Continuation-in-part of Ser. No. 794,116, May 5, 1977, abandoned.

[30] Foreign Application Priority Data

May 10, 1976 [JP] Japan .................................. 51-52225

[51] Int. Cl.³ ............................................. G06F 3/04
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,303,476 | 2/1967 | Moyer et al. | 364/200 |
| 3,815,099 | 6/1974 | Cohen et al. | 364/200 |
| 3,830,962 | 8/1974 | Mailloux | 364/900 X |
| 4,000,485 | 12/1976 | Barlow et al. | 364/200 |
| 4,053,950 | 10/1977 | Bourke et al. | 364/200 |

Primary Examiner—Gareth D. Shaw
Assistant Examiner—Thomas M. Heckler
Attorney, Agent, or Firm—Craig and Antonelli

[57] ABSTRACT

There is provided a data transfer system for use in a data processing system. The data processing system comprises a central processor for processing information in accordance with an instruction stored in a main memory equipment, a peripheral equipment operable by receiving the instruction from the central processor and transmitting to the central processor a control information which requires the central processor to effect successive controlling operation, and an address bus, data bus and execution bus connecting the central processor to the peripheral equipment. When transferring data from the central processor to the peripheral equipment, the operating sequence procedure of the central processor is changed in accordance with the content on the status bus through which the control information from the peripheral equipment is transmitted to the central processor, whereby a sequence commensurate with the status of the peripheral equipment in operation is effected within the same instruction.

7 Claims, 10 Drawing Figures

DATA TRANSFER SYSTEM

CROSS-REFERENCE TO RELATED APPLICATION

This application is a continuation-in-part application of the copending U.S. Patent application Ser. No. 794,116 filed on May 5, 1977, abandoned.

The present invention relates to a data transfer system for use in a data processing system which transfers data from a central processor to peripheral equipments, and particularly to a program control data transfer system wherein the peripheral equipments are controlled by an input-output instruction of the central processor.

In general, the peripheral equipment requires certain information data, the amount of the data being determined in accordance with what operation is carried out by the peripheral equipment, when the peripheral equipment executes an instruction from the central processor. Therefore, the central processor is required to transmit the amount of the information data necessary for the operation specific to the peripheral equipment along with the instruction. Where the data transfer is effected under program control, it was a conventional practice to inevitably provide different input-output instructions commensurate with different various data to be transferred. In other words, as the type of data to be transferred increases, the number of the input-output instructions is necessarily increased correspondingly. However, due to the fact that types of instruction which can be provided for the central processor are limited if the instruction word length is fixed, the number of instruction codes to be assigned to the input-output instruction must be determined within a certain limit.

A main object of the present invention is to provide an improved data transfer system capable of transferring, by means of a single input instruction or a single output instruction, data commensurate with the need of the peripheral equipment which is assigned with the input instruction or the output instruction.

Specifically, according to the invention, a status bus is provided between a central processor and a peripheral equipment. The peripheral equipment commences to operate by receiving an input-output instruction from the central processor and transmits to the status bus a status signal which indicates that the selected peripheral equipment requires further data transfer so as to execute the input-output instruction. The central processor effects a subsequent data transfer in accordance with the content of the information on the status bus. Accordingly, so long as the peripheral equipment successively transmits the request for data transfer to the status bus, the central processor successively accesses this peripheral equipment.

Other objects and features of the invention can be understood more fully from the following description taken in conjunction with the accompanying drawings in which.

Figure 1:
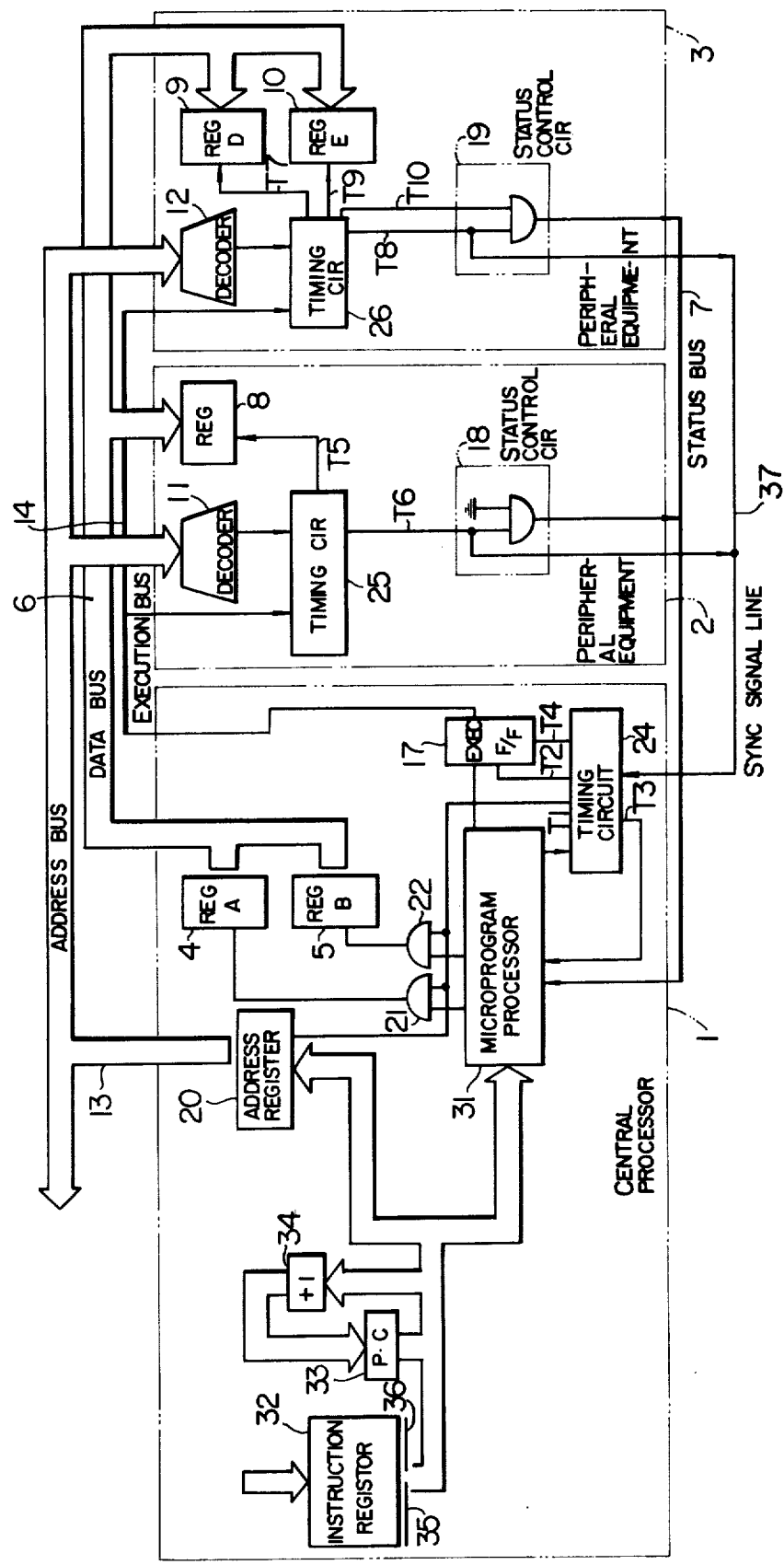
FIG. 1 is a block diagram of a data transfer system embodying the invention.

Referring now to FIG. 1 showing an overall diagram of a data processing system, a central processor 1 is connected to peripheral equipments 2 and 3 via an address bus 13, a data bus 6, an execution bus 14 and a status bus 7.

The central processor 1 comprises an address register 20 which fetches an instruction from a main memory (MM) (not shown) for storing it temporarily, registers 4 and 5 used as general data storing registers, an execution flip-flop (Exec. F/F) 17 for sending a control signal to the execution bus 14, a microprogram processor 31 having a read only memory (ROM) for storing a microprogram, a timing circuit 24 for controlling the timing of the central processor 1, gates 21 and 22 for controlling a control signal, an instruction registor 32, a program counter (PC) 33 which determines an address to be fetched from a main memory (MM), not shown, and an adder circuit 34 for adding one to the address.

The peripheral equipment 2 comprises an instruction decoder 11 for decoding an instruction on the address bus, a register 8 used as general data receiving register and having a first data storing capacity, a timing circuit 25 for controlling the timing of the peripheral equipment 2, and a status control circuit 18 for sending a control signal to the status bus 7.

The other peripheral equipment 3 has a similar arrangement to the peripheral equipment 2 but comprises two registers 9 and 10 used as general data receiving registers and having in total a data storing capacity larger than that of the peripheral equipment 2.

As will be seen from FIG. 1, the central processor 1 transfers the content of the registers 4 and 5 to the registers 8, 9 and 10 connected thereto by way of the data bus 6 under the control of address, execution and status buses 13, 14 and 7.

The data transfer system further comprises a synchronizing signal line 37. This signal line informs the timing circuit 24 in the central processor of timings T6 and T8 at which status signals are delivered to the status bus from the peripheral equipments.

Figure 2:
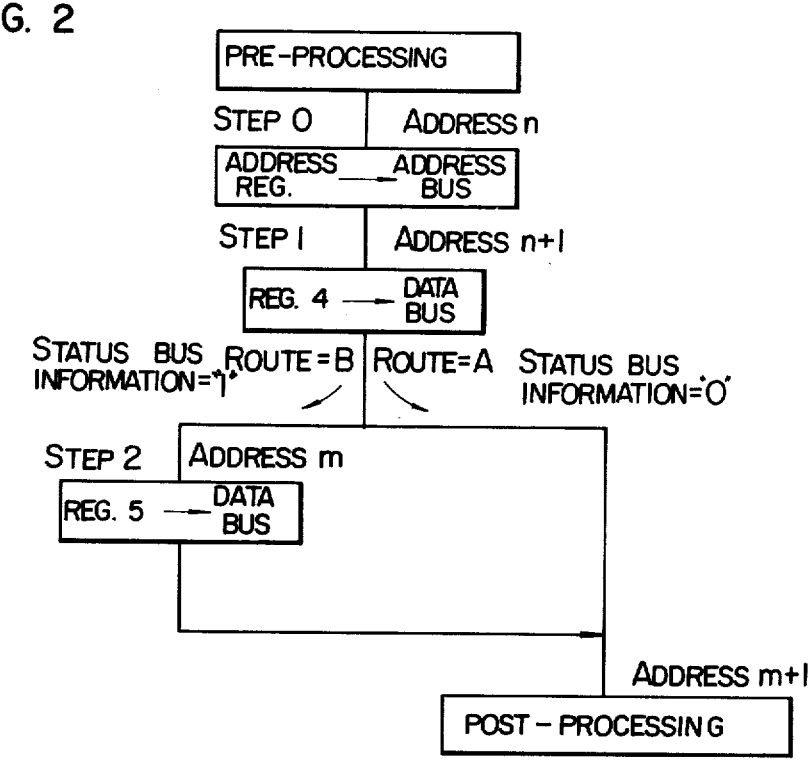
FIG. 2 is a microprogram flow chart showing operating sequence of a central processor.

FIG. 2 shows a microprogram flow chart for explaining an operating sequence executed with the central processor 1 of a microprogram type.

The term "microprogram flow chart" herein represents a compilation set down with a sequence of a microprogram which is used when a process necessary for executing a program is effected by means of the microprogram.

The term "pre-processing" in FIG. 2 generally represents a procedure prior to the execution of instructions of the program and the transmission of the content of register 4 to the data bus 6 as designated by STEP 1. Particularly, as detailed below, the pre-processing is performed by successively executing the microprogram and being quite analogous to a processing which is performed in the central processor for microprogram control as well-known. At first, an address designated by the program counter 33 is transferred to the address register 20 which in turn delivers the address to the address bus. At this time, an instruction designated by this address is read out of the main memory. The data information thus read out is latched in the instruction register 32. That instruction comprises an operation command 35 and an address command 36, of which the operation command 35 is delivered to the microprogram processor 31 at which it is decoded. The decoded command is used as a heading address of a microprogram routine corresponding to that operation. If the operation command 35 implies an instruction representative of output to the peripheral equipment, STEP 0 and STEP 1 as shown in FIG. 2 is then executed.

A branch follows the STEP 1, depending on an information on the status bus 7. A route A is for the information bearing "0" and a route B is for the information bearing "1". STEP 2 corresponds to the transmission of the content of register 5 to the data bus 6. A box expressing "post-processing" generally implies a procedure for terminating instructions of the program.

In the post-processing, one is added to the program counter 33 so that the program counter 33 is renewed for fetching a subsequent instruction.

Thus far, one execution of instruction has been completed. Then, the aforementioned microprogram routine of the pre-processing repeats in order to execute a subsequent instruction.

Figure 5:
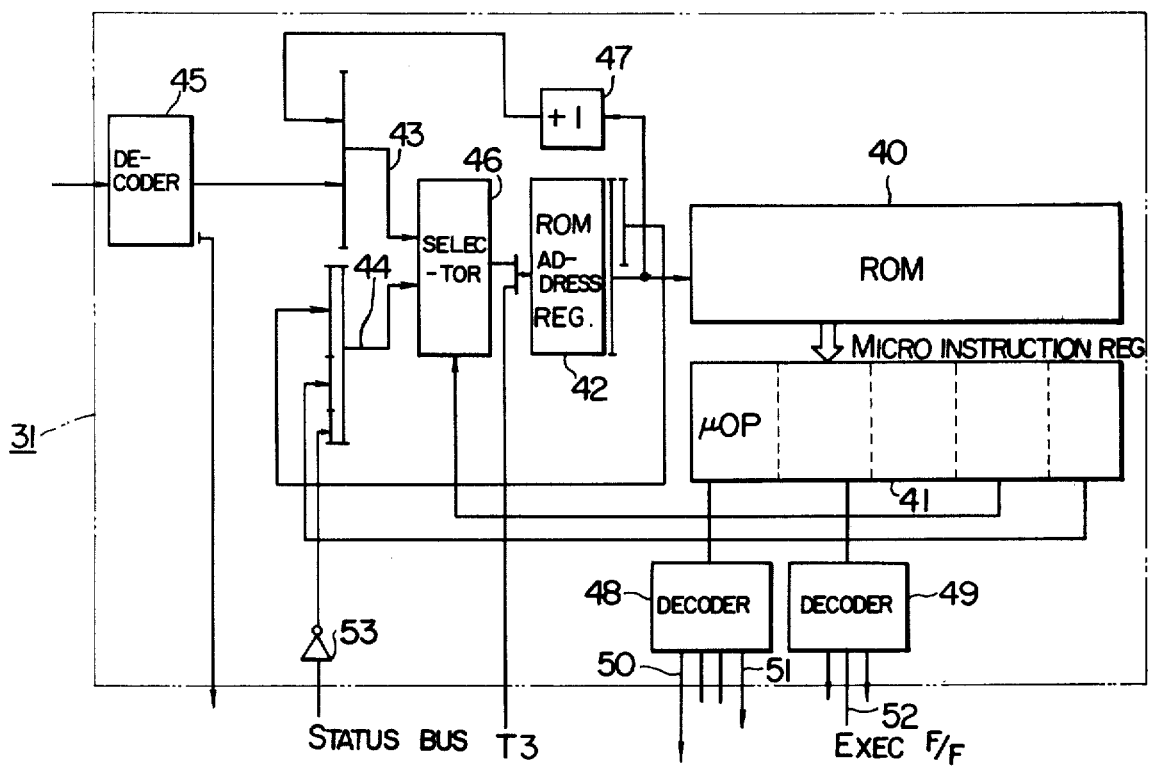
FIG. 5 is a block diagram illustrating the detail of a microprogram processor in FIG. 1.

FIG. 5, to which reference should be made, shows a connection diagram of the microprogram processor 31. A read only memory (ROM) 40 is adapted to store a plurality of microprogram routines including the aforementioned pre-processing, post-processing and a processing prescribed by an operation for a read-out instruction. A micro instruction of the ROM 40 is fetched by a micro instruction register 41 in accordance with an address delivered from an ROM address register 42. A selector 46 which selects one of addresses 43 and 44 is controlled by an address selecting field information included in the read-out micro instruction. The address 43 comprises an address representative of an operation command 35, decoded by a decoder 45, of an instruction from the instruction register 32 and an address resulting from addition of one to an address of the ROM address register 42 in +1 adder circuit 47. The decoder 45 yields not only a micro instruction address corresponding to the operation command 35 but also a signal indicating that this operation command is representative of output for command to the peripheral equipment. The address 44 includes in combination an upper address of ROM address register 42, a value given by a constant field of the micro instruction register 41 and an information from the status bus. The micro instruction also includes a micro operation field which prescribes the operation of the micro instruction. A decoder 48 decodes the micro operation field. The decoder 48 has on its output side a plurality of signal lines including a line 50 fed to the gate 21 and a line 51 fed to the gate 22. The output signal line 50 bears a logic "1" when the micro operation field designates an operation that a data information of the register 4 should be sent to the data bus 6 whereas the output signal line 51 bears a logic "1" when an operation is designated that a data information of the register 5 should be sent to the data bus 6. The remaining output signal lines of the decoder 48 are fed to gates (not shown) incorporated in the central processor 1 and bear logics "1" when operations other than the two operations are designated.

In a similar manner, a register designating field of the micro instruction register 41 is decoded by a decoder 49 having a plurality of output signal lines one of which, as represented by 52, bears a logic "1" when the execution F/F 17 should be designated, remaining output signal lines bearing logics "1" when other registers or flip-flops (not shown) are designated by the register designating field.

Any addresses are set into the ROM address register 42 by means of a timing pulse T3.

An operation will now be described with an output instruction indicating the data transfer to the peripheral equipment. When the output instruction is fetched through the pre-processing routine, an operation command 35 comprised by the output instruction is decoded by the decoder 45 and a resulting address n is set into the ROM address register 42 via the selector 46 so that the STEP 0 of FIG. 2 is fetched. By executing the STEP 0, an address of the address register 20 is sent to the address bus.

Thereafter, the address n is renewed by the +1 adder circuit 47 to form an address of n+1, thereby the STEP 1 being fetched. When the STEP 1 is fetched, the signal line 50 is caused to bear the logic "1" which enables the gate 21 during time T1. The signal line 52 is also caused to bear the logic "1" which sets the execution F/F for delivering an information "1" to the execution bus 14. The subsequent flow of program is branched as shown in FIG. 2 and at this time, the address selecting field of the micro instruction register 41 has selected the address 44. The least significant bit of the address 44 is determined dependent on information on the status bus. The information "1" on the status bus is inverted by an inverter 53 to form an address m having the least significant bit of "0" by which the STEP 2 is fetched. In the STEP 2, the signal line 51 is caused to bear the logic "1" which enables the gate 22 during time T1, thereby delivering a data information of the register 5 to the data bus 6. The address selecting field related to the STEP 2 has selected the address 43. Accordingly, the subsequent addition of one to the address m is effected and a resulting address of m+1 is set to the ROM address register 42 to fetch the post-processing.

With an information "0" on the status bus, an address m+1 is formed corresponding to an address 44 having the least significant bit of "1" so that the STEP 2 skips, followed by fetching the post-processing. In this manner, even with the same input/output instruction operation, different processing flows result depending on "1" or "0" status bus information. This permits a number of data transfers as required by the peripheral equipment.

Figure 10:
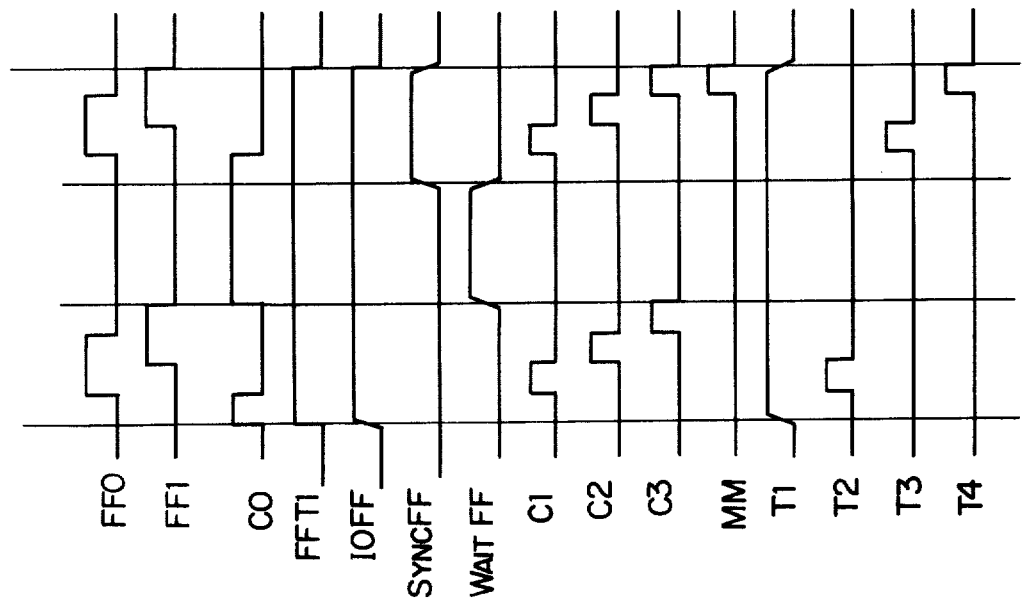
FIG. 10 is a time chart useful to explain operation of the timing circuit shown in FIG. 9.
Figure 9:
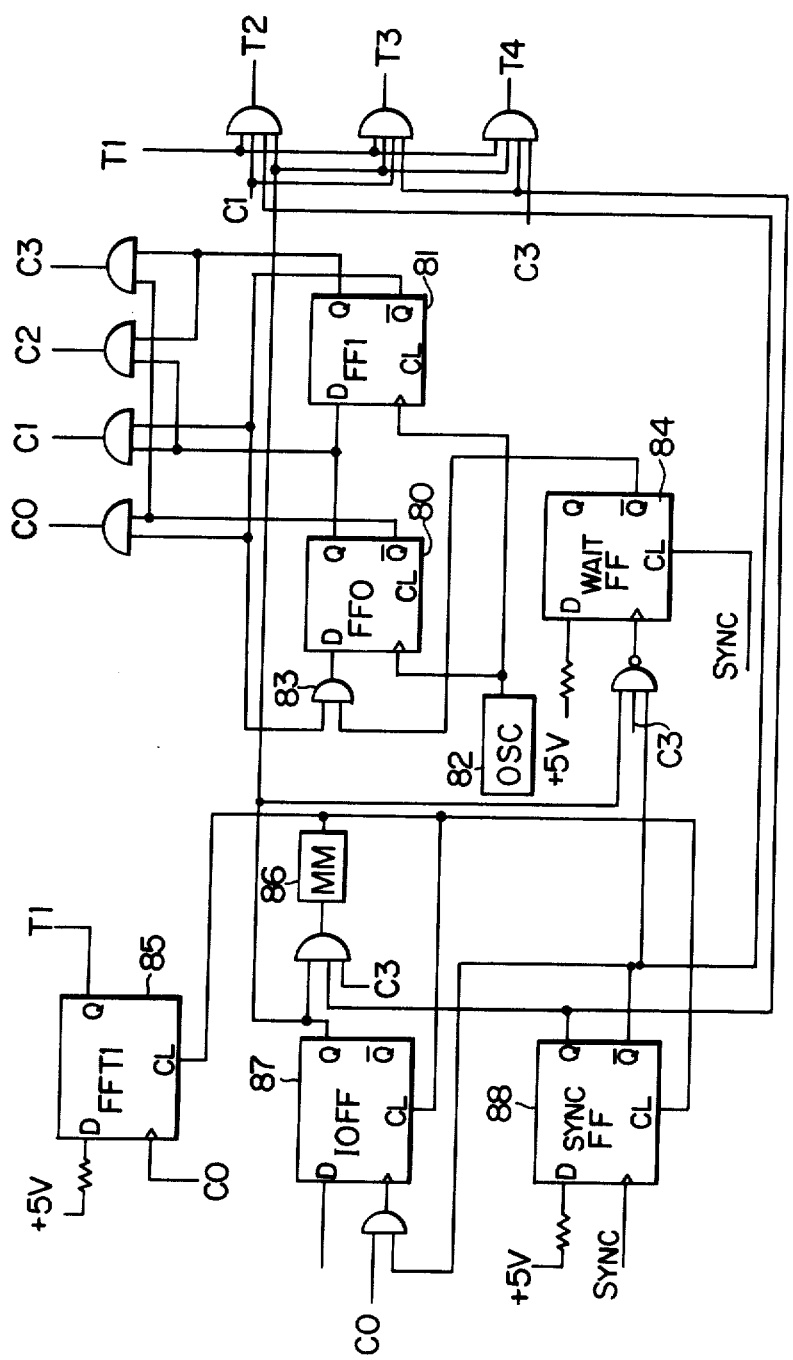
FIG. 9 is a block diagram illustrating the detail of a timing circuit 24 in FIG. 1.

Turning to FIGS. 9 and 10, the timing circuit 24 will be described in more detail. Of flip-flop circuits (hereinafter simply referred to as FF) FF0 80 and FF1 81 as illustrated in FIG. 9, the FF0 has its Q output connected to a data terminal D of the FF1 and FF1 has its $\overline{Q}$ output connected to a data terminal D of the FF0. These FF0 and FF1, when an AND gate 83 is opened, produce repetition of pulses in synchronism with pulses from an oscillator 82 generating regular repetitive pulses. As shown in FIG. 10, pulses of the FF0 and FF1 are out of phase with each other by half a period of the oscillator pulse and have a pulse width twice a period of the oscillator pulse. Symbols C0, C1, C2 and C3 are ANDed outputs of $\overline{Q}$ outputs of FF0 and FF1, Q output of FF0 and $\overline{Q}$ output of FF1, Q outputs of FF0 and FF1, and $\overline{Q}$ output of FF0 and Q output of FF1, respectively.

A WAIT FF 84 is set by the falling of a pulse C3 when Q output of an IOFF 87 is "1" and $\overline{Q}$ output of a SYNCFF 88 is "1", and is cleared by a synchronizing signal SYNC on the line 37. A $\overline{Q}$ output of the WAIT FF is fed to the AND gate 83.

It is gathered from the above description that, as shown in FIG. 10, those outputs C0, C1, C2 and C3 appear with out-of-phase relationship in this order when the WAIT FF is in reset state and the output C0 bears a logic "1" when the WAIT FF is in reset state, establishing a wait state.

A FFT1 85 is set by the output C0 and reset by the output of a monostable multivibrator 86. The set output of the FET1 85 stands for the timing T1.

The SYNC FF 88 is set by receiving the synchronizing signal SYNC from the peripheral equipment and cleared by the output of the monostable multivibrator 86.

The IOFF 87 is set when both an output instruction signal produced by detecting the fetch of an output instruction by means of the decoder 45 in the microprogram processor and an ANDed output of the output C0 and $\overline{Q}$ output of the SYNC FF 88 are in logics "1", and cleared by the output of the monostable multivibrator 86. The output instruction signal is maintained at "1" during the execution of the microprogram routine due to the output instruction. With "1" states of both the IOFF 87 and SYNC FF 88 together with the rise of the output C3, the monostable multivibrator 86 is triggered to generate a one-shot pulse.

The timing T2 is produced when T1, C1, Q output of the SYNC FF 88 and Q output of the IOFF 87 and ANDed. The timing T3 is produced when T1, C1, Q output of the IOFF 87 and Q output of the SYNC FF 88 are ANDed. Also, the timing T4 is produced when T1, Q output of the IOFF 87, Q output of the SYNC FF 88 and C3 are ANDed.

In operation, the ANDed output C0 first bears the logic "1" to bring the FFT1 85 into the logic "1" so tha the timing T1 takes the "1" state during one cycle of the execution of the micro instruction. As a result, the AND gates 21 and 22 are enabled which gate control signals from the microprogram processor. Since the $\overline{Q}$ output of the WAIT FF 84 is in "0" state, FF0 80 and FF1 81 are operated and then the output C1 bears the logic "1". At this time, the $\overline{Q}$ output of the SYNC FF 88 is in "1" state and the Q output of the IOFF 87 is in "1" state, causing the timing T2 to appear. This timing T2 sets the EXEC F/F 17. Thereafter, the output C3 sets the WAIT FF 84 to thereby clear the FF0 80 and FF1 81, bringing the output C1, C2 and C3 into "0" states. As the processing by the peripheral equipment proceeds, transmitting the synchronizing signal SYNC, the SYNC FF 88 takes the "1" state and the WAIT FF 84 is reset to take "0" state. By this, the outputs C1, C2 and C3 bear "1" states successively, but the "1" state of SYNC FF 88 prevents the timing T2 from being produced, permitting the production of the timing T3. The signal on the status bus is fetched by means of the timing T3 and an address for fetching a new microprogram is prepared. Also, the "1" state of SYNC FF together with the output C3 permits the production of the timing T4 which in turn clears the EXEC F/F 17.

Figure 3:
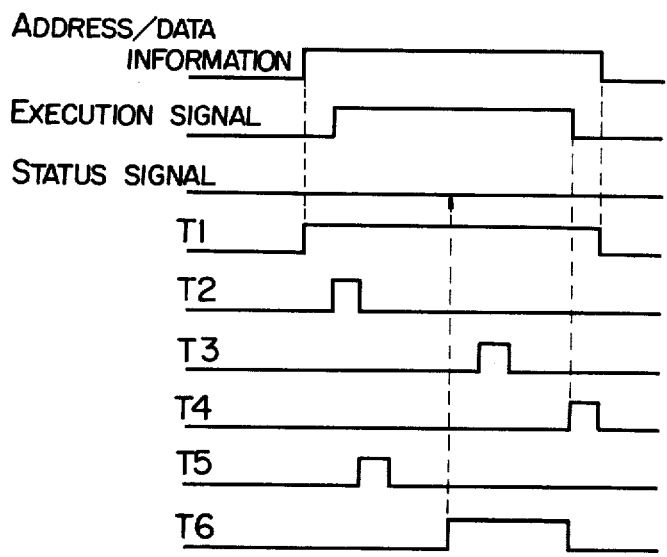
FIG. 3 is a time chart useful to explain operation of one peripheral equipment.

In operation, as will be better understood by referring to FIGS. 1 and 2 as well as FIG. 3 showing a timing chart of instructions, the central processor 1 fetches an instruction from a main memory equipment (not shown) to store it in the address register 20. Following storage, the instruction is examined as to whether or not it is an output instruction for the peripheral equipments 2 and 3. When the instruction is identified as the output instruction, the data transfer commences. After subjected to the necessary pre-processing, the instruction so identified as output instruction executes the STEP 1 wherein the register 4 will be designated by means of a microprogram stored in the microprogram processor 31. In the gate 21, a timing pulse T1 of the timing circuit 24 and the output of microprogram processor 31 are ANDed to trigger the register 4 so that the content of the register 4 is sent to the data bus 6 as a data information. Concurrently therewith, the timing pulse T1 from the timing circuit 24 triggers the address register 20, thereby the content thereof being transmitted to the address bus 13 as an address information. In order to trigger the peripheral equipments 2 and 3, the Exec. F/F 17 is set by a timing pulse T2 from the timing circuit 24 so that a signal is sent to the execution bus 14.

In the peripheral equipment 2 and/or 3, the instruction decoder 11 and/or 12 decodes the instruction on the address bus 13. When one and/or two of the decoders 11 and 12 are triggered, they trigger the timing circuits 25 and 26. Either timing circuit 25 or 26 commences to operate when an execution signal is sent to the execution bus 14. Assuming now that the peripheral equipment 2 is designated, the timing circuit 25 is triggered to produce a timing T5 which in turn causes the register 8 to fetch a data signal on the data bus 6. The timing circuit 25 judges whether or not the peripheral equipment 2 requires further data. Since the peripheral equipment 2 does not require further data, the timing circuit 25 delivers a timing pulse T6 to enable a gate of the status control circuit 18. Since the other input of this gate is connected to the earth, an information "0" indicative of the termination of the data transfer is transmitted to the status bus 7 during the interval of the timing pulse T6. The central processor 1 fetches the information "0" on the status bus 7 by means of the timing pulse T3, that is, the timing pulse T3, the information on the status bus 7 and a portion of the present data of the microprogram are ANDed to determine an address of the subsequent microprogram. Because of the status information "0", the route A of FIG. 2 is traced. After the necessary post-processing has been completed, the timing circuit 24 causes the Exec. F/F 17 which is delivering the execution signal to be reset by means of a timing pulse T4 and the central processor 1 completes the output instruction.

In this manner, the output instruction implying the transfer of the content of register 4 to the register 8 in the peripheral equipment 2 is completed.

Figure 4:
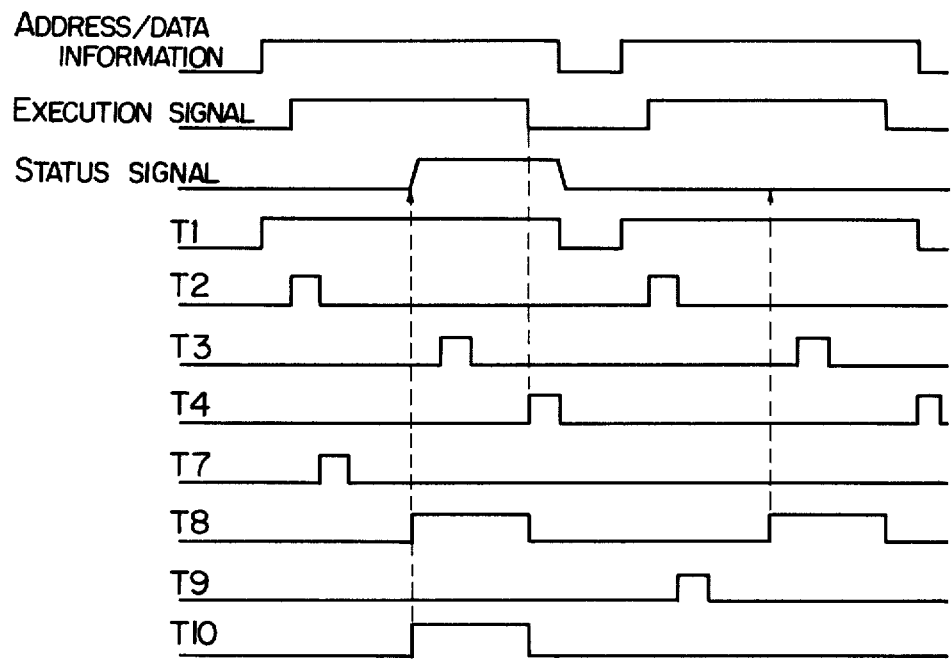
FIG. 4 is a time chart useful to explain operation of the other peripheral equipment.

Next, how the same output instruction is related to the peripheral equipment 3 will be described with reference to a timing chart of FIG. 4. Assume that the peripheral equipment 3 comprises the two registers 9 and 10 to receive data twice during one cycle of operation, as shown in FIG. 1.

The central processor 1 fetches the instruction from the main memory equipment for storing it in the address register 20 and transmits signals to the address bus and execution bus in the same manner as described in connection with the peripheral equipment 2, a description of which is not detailed any more.

When the peripheral equipment 3 is designated, the timing circuit 26 is triggered and data on the data bus 6 is fetched by the register 9 by means of a timing pulse T7. The timing circuit 26 judges whether or not the peripheral equipment 3 requires further data. Assuming that, in this case, the peripheral equipment 3 requires further data, the timing circuit 26 enables a gate of status control circuit 19 by means of timing pulses T8 and T10 so that the status control circuit 19 transmits an information "1" indicative of the need for successive data transference to the status bus 7. The microprogram processor fetches the status signal "1" on the status bus and determines a subsequent microprogram. Because of the status information "1", the route B of FIG. 2 is traced to execute the STEP 2. At the same time, in order to transfer the content of the register 5 to the peripheral equipment 3, the timing circuit 24 of the central processor 1 resets the Exec. F/F 17 which is delivering the execution signal by means of the timing pulse T4. Then, the register 5 is designated by a new microprogram fetched from the microprogram processor. In the gate 22, the timing pulse T1 of the timing circuit 24 and the output of microprogram processor 31 and ANDed to trigger the register 5 so that the content of the register 5 may be transmitted to the data bus 6. Concurrently therewith, the timing pulse T1 of the timing circuit 24 also triggers the address register 20, thereby the content thereof being sent to the address bus 13. In order to trigger the peripheral equipments 2 and 3, the timing pulse T2 of the timing circuit 24 sets the Exec. F/F 17 and the execution signal is sent to the execution bus 14.

Since the peripheral equipment 3 still remains designated, the timing circuit 26 is triggered to cause the register 10 to fetch data on the data bus 6 by means of a timing pulse T9. The peripheral equipment 3 judges the instruction as to whether or not there is need for further data. At present, the peripheral equipment 3 does not require further data and accordingly, the timing pulse T10 causes with the result that an information "0" is transmitted to the status bus by means of the timing pulse T8. The microprogram processor fetches the status signal on the status bus and determines an address of a subsequent program. Because of the status information "0", the route B of FIG. 2 is traced and the post-processing is effected to complete the output instruction.

In this manner, for the peripheral equipment 3, the content of the register 4 is transferred to the register 9 and the content of the register 5 is transferred to the register 10, thereby completing the output instruction.

It should be understood from the operational description set forth hereinbefore that, in contrast to the prior art wherein when the amount of data to be transferred to the peripheral equipment differs, different input-output instructions are necessitated correspondingly or the number of data commensurate with the amount of data to be transferred must be executed, according to the present invention, the provision of the status bus ensures the peripheral equipment to control the amount of data to be transferred, thereby making it possible to transfer different amounts of data to be transferred from the central processor to the peripheral equipment by utilizing only one type of input-output instruction.

Figure 6:
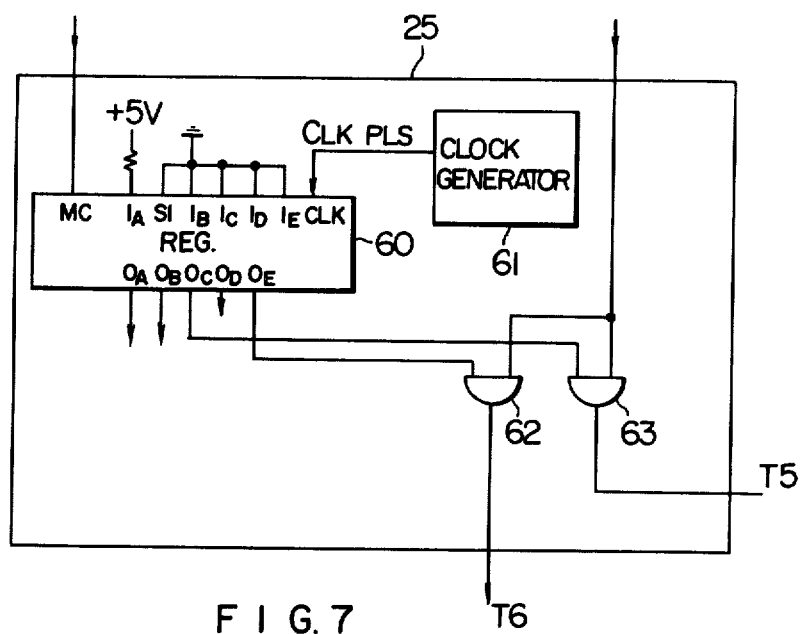
FIG. 6 is a block diagram illustrating the datail of a timing circuit 25 in FIG. 1.

The timing circuit 25 will be detailed by referring to a connection diagram as shown in FIG. 6.

Figure 7:
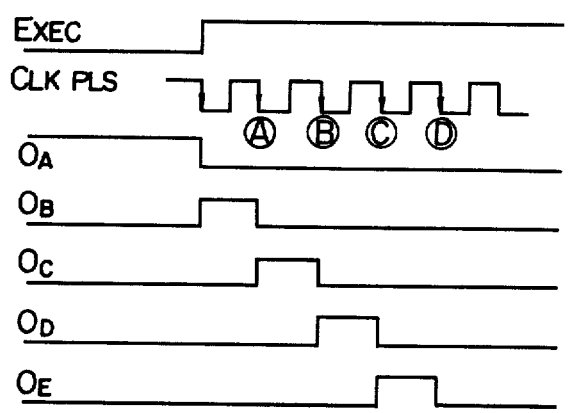
FIG. 7 is a time chart useful to explain operation of the timing circuit shown in FIG. 6.

A clock generator 61 is adapted to generate regular repetitive pulses as shown in FIG. 7. A timing generator 60 is a sort of 5 bit shift register and receives data input in parallel at respective bits $I_A$, $I_B$, $I_C$, $I_D$ and $I_E$ when the execution bus is in "0" state. A voltage of +5 and earth potential shown in FIG. 6 respectively inject "1" and "0" in parallel. Particularly, bits A, B, C, D and E are fed with "1", "0", "0", "0" and "0", respectively. When the logic "1" is present on the execution bus, the timing generator 60 fed with the parallel inputs begins to operate in the mode of a shift register and input information injected thereto is shifted successively from bit A to bit E in synchronism with the clock pulse (CLK PLS). Accordingly, only the output $O_A$ among the outputs $O_A$, $O_B$, $O_C$, $O_D$ and $O_E$ takes a "1" information before the execution bus bears "1" state as shown in FIG. 7. However, the "1" information at the bit A is shifted every time that the clock pulse is applied so that with the first clock pulse the output $O_B$ bears "1", with the record pulse the output $O_C$ bears "1" and so on, generating a timing signal. A timing signal on the output $O_C$ is delivered to an AND gate 63 and a timing signal on the output $O_E$ to an AND gate 62. These gates are enabled when the decoder 11 of a specified peripheral equipment detects such and address on the address bus that designates this specified peripheral equipment. The output T5 of the AND gate 63 is used to set the data on the data bus into the register 8 and the output T6 of the AND gate 62 is used as a timing signal for delivering a "0" information to the status bus.

It is intended by the timing generator 60 to generate a plurality of timing signals which successively bear the state "1" at predetermined time intervals as shown in FIG. 7. The construction of the timing generator is not limited to one described in this embodiment.

Figure 8:
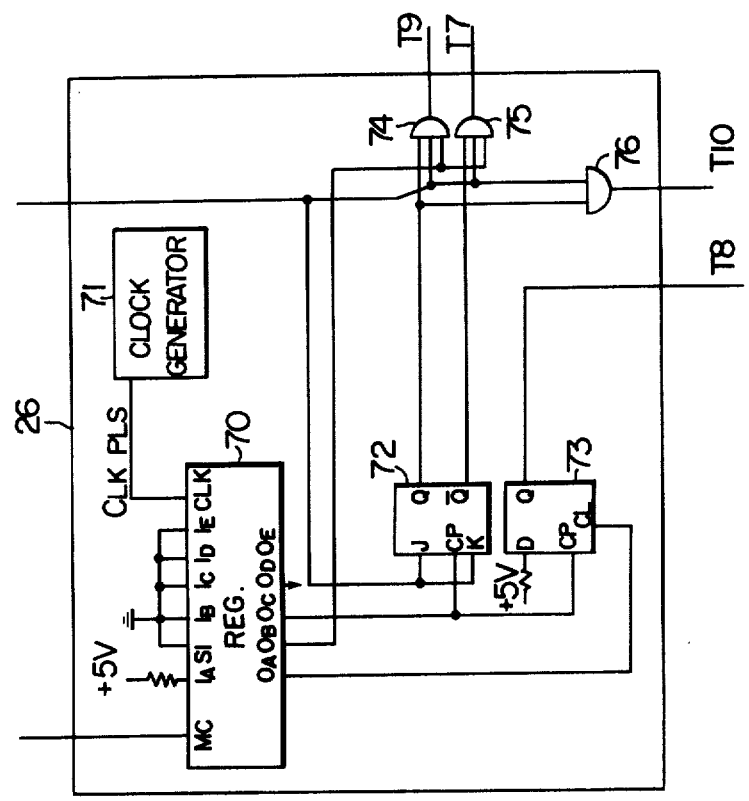
FIG. 8 is a block diagram illustrating the detail of a timing circuit 26 in FIG. 1.

Reference is now made to FIG. 8 showing a connection diagram of the timing circuit 26. A timing generator 70 and a clock generator 71 have the same constructions as those shown in FIG. 6. Flip-flop circuits 72 and 73 shown in FIG. 8 are provided for counting the data transfer in twice. The flip-flop circuit 72 operates such that the output Q bears a logic "1" when a first trigger is applied to a terminal CP under the application of signals to input terminals J and K and the output $\bar{Q}$ bears a logic "1" when a second trigger, subsequent to the first trigger, is applied. The flip-flop 73 has its input terminal D constantly applied with an input logic "1". A trigger applied to a terminal CP attributes to a logic "1" on the output Q and a signal applied to a terminal CL clears the flip-flop 73. When a specified peripheral equipment is selected and its decoder 12 delivers a logic "1", the timing circuit 26 operates as follows. In the first cycle, at a timing at which the output $O_A$ is in "1" state, the flip-flop circuits 72 and 73 are both in "0" states. At a timing at which the output $O_B$ is in "1" state, an AND gate 75 is enabled to generate the timing signal T7. This timing signal T7 sets the data on the data bus to the register 9. Then, at a timing at which the output $O_C$ is in "1" state, the flip-flop circuits 72 and 73 are both rendered "1" so that an AND gate 76 is enabled to deliver a logic "1" onto the status bus. In consequence, a data transfer is again effected from the central processor. In the second cycle, at the timing at which the output $O_A$ is in "1" state, the flip-flop circuit 73 is cleared to "0". The flip-flop circuit 72 remains at "1" state. At the timing at which the output $O_B$ is in "1" state, the AND gate 74 is enabled to generate the timing T9. This timing T9 sets data on the data bus into the register 10. Next, at the timing at which the output $O_C$ is in "1" state, the flip-flop circuit 72 is rendered "0" whereas the flip-flop circuit 73 is rendered "1", thereby delivering a logic "0" onto the status bus.

The central processor receives the logic "0" from the status bus, completing the input/output instruction.

In this embodiment, the twice data transfer is described. A triple data transfer, if desired, may be effected by adding one additional flip-flop circuit such as a flip-flop 72.

In the foregoing embodiment, the information to be sent to the status bus has been characteristic of the peripheral equipment but a modification may be obtained wherein if a specific peripheral equipment is provided with different status requiring different amounts of data, the amount of data to be transferred may be controlled by each instruction by means of controlling the information to be transmitted to the status bus in accordance with the different status. Further, by increasing the number of the status bus, type of the sequence executed by the central processor may be extended.

As has been described in the foregoing according to the present invention, it is possible to extend the function of the input-output instruction without increasing the number of instructions from the central processor, whereby the simplification of the program and substantial improvement of the processing speed can be attained.

We claim:

1. A data transfer system comprising:
   a central processor for processing information by fetching and executing an output instruction stored in and read out of a main memory equipment, the output instruction including address information and command information,
   a plurality of peripheral equipments each having a data storing capacity, at least one of said peripheral equipments having a larger data storing capacity than that of remaining peripheral equipments, and
   a group of buses including an address bus, a data bus and a status bus and connecting the central processor to each of the plurality of the peripheral equipments,
   said central processor comprising a plurality of data registers for storing data to be transferred, address transfer means for transmitting to said address bus the address information indicative of one of the peripheral equipments to which the data stored in said data registers is to be transferred, first data transfer means for permitting transmission to said data bus the data stored in one of said data registers in response to a data transfer control signal applied thereto, second data transfer means for operatively permitting transmission to said data bus the data stored in another one of the remaining data registers other than said one data register, said data registers transmitting data repeatedly one after another without changing the address information of said address transfer means due to maintenance of the same output instruction fetched, and means for terminating the data transfer,
   said peripheral equipment each comprising means, connected to the address bus to receive said address information transmitted therethrough for judging whether or not said address information designates the associated peripheral equipment, data receiving means for receiving data transmitted through said data bus when the associated peripheral equipment is designated by said address information, said data receiving means having a data storing capacity which corresponds to that of the associated peripheral equipment, and is required for operation of the associated peripheral equipment, and status signal means for judging whether or not the data received by said data receiving means is less than the data required for the operation of the associated peripheral equipment and for generating a status signal indicating that the data received by said data receiving means is less than the data required for the operation of the associated peripheral equipment, said status signal means operating to transmit the thus generated status signal to the status bus for transmission to said central processor,
   said second data transfer means being responsive to the status signal transmitted through the status bus and operatively permitting transmission to said data bus the data stored in the another of said plurality of said data registers, and
   said terminating means being responsive to the absence of the status signal on the status bus and operatively terminating the data transfer by said first and second data transfer means,
   whereby more than one data transfer from the central processor to a selected one of the peripheral equipments is effected by transmission of the status signal from the selected one of the peripheral equipments to said central processor under the same output instruction fetched by said central processor.

2. A data transfer system according to claim 1, wherein said data receiving means of one of said plurality of peripheral equipments comprises at least two receiving registers and setting means for selectively controlling the setting of data from said data bus into the at least two registers by selecting the registers one by one, wherein the total sum of data storing capacity of said plural data registers of the central processor corresponds to the maximum total sum of data receiving capacity of said receiving registers of the one peripheral equipment, and wherein said status signal means of the one peripheral equipment provides a status signal in accordance with the number of settings determined by said setting means for setting data into all the registers of the one peripheral equipment such that the status signal is transmitted to said central processor through said status bus until the setting of the data from said data bus into all of said receiving registers has been completed.

3. A data transfer system according to claim 1, wherein said output instruction comprises an operation command for designating the data transfer operation to the peripheral equipment and an address command for designating the peripheral equipment to which data are transferred, whereby said address transfer means of said central processor transfers said address command to said plurality of peripheral equipments through said address bus.

4. A data transfer system according to claim 1 which comprises an execution bus connecting said central processor to said plurality of peripheral equipments, said central processor comprising means for sending an execution signal to the execution bus when fetching the output instruction, said peripheral equipments each comprising means for starting the operation of said data receiving means by receiving the execution signal from said execution bus.

5. A data transfer system according to claim 1, wherein said address transfer means comprises address gate means for permitting or inhibiting the transfer of address information designating the peripheral equipment to said address bus and first gate control means for controlling said address gate means, said first data transfer means comprises first data gate means for permitting or inhibiting the transfer of data from one of said register to said data bus and second gate control means for controlling said first data control means, and said second data transfer means comprises second data gate means for permitting or inhibiting the transfer of data to said data bus from registers other than the register from which data are transferred by means of said first data transfer means and third gate control means for controlling said second data gate means.

6. A data transfer system according to claim 5, wherein said first, second and third gate control means are comprised of a microprogram processor, said microprogram processor comprises a memory for storing a microprogram and control means for fetching and executing said microprogram, said microprogram comprising a first step of transferring the address information to said address bus by enabling said address gate means, a second step of transferring data from said register to said data bus by enabling said first data gate means, and a third step of transferring data from said register to said data bus by enabling said second data gate means, whereby when said central processor fetches the output instruction, each of the steps is fetched by said control means from said memory and executed, said third step being selectively executed when the status signal is transferred through said status bus but skipped when said status signal is absent.

7. A data transfer system comprising:
a central processor;
a plurality of peripheral equipments; and
a group of buses including an address bus, a data bus and a status bus, said group of buses being provided between said central processor and said peripheral equipments;
at least one of said peripheral equipments having at least two data receiving registers while the remaining peripheral equipments have one data receiving register, the number of data receiving registers being determined by the operating requirements of each peripheral equipment,
said central processor operatively fetching and executing an instruction which indicates data transfer to one of the peripheral equipments and includes an operation command and an address information designating the selected one peripheral equipment, said central processor having a plurality of data registers for storing data to be transferred, the total sum of data storing capacity of said data storing registers corresponding to the maximum total sum of data receiving capacity of said receiving registers of said at least one peripheral equipment, an instruction register for latching the instruction read out of a main memory designating data transfer to one of the peripheral equipments, said instruction including an address command designating the address information of said selected one peripheral equipment and an operation command, first means for decoding the address command and for transmitting to said address bus the thus decoded address information, second means for decoding the operation command, a plurality of gates one of the gates being provided for each one of the data registers and the plurality of gates being rendered operative one after another in response to a gate operation control signal supplied thereto for enabling transmission to said data bus data stored in the data register associated with the operative one of the gates, executing means supplied with the thus decoded operation command from said second means for generating control signals in timed sequence in accordance with a prescribed program which is predetermined by the operation command, said timed sequence generated control signals being supplied to the plurality of gates as the gate operation control signal thereof, and means for terminating the operation of the executing means, and each of said peripheral equipments further having means connected to the address bus to receive the address information transmitted therethrough for judging whether or not the address information designates the associated peripheral equipment, means for permitting receipt of data transmitted through the data bus into the associated receiving registers when the judging means judges the associated peripheral equipment is selected, and status signal means for judging whether or not all of the required data is fully received by the associated receiving registers and for generating a status signal indicating that the data is not fully received by the associated receiving registers, so that said status signal means transmits the status signal to the status bus for permitting transmission to said central processor, said executing means being responsive to the status signal transmitted through the status bus for maintaining generation of the control signals so as to permit transmitting to the data bus data stored in another of said data registers, and said terminating means being responsive to the absence of the status signal on the status bus for terminating the generation of the control signal by said executing means, whereby transmission request of data transfer is initiated from each selected one of the peripheral equipments without changing the same instruction latched by the instruction register.

* * * * *